United States Patent
Koma

(10) Patent No.: US 7,518,689 B2
(45) Date of Patent: Apr. 14, 2009

(54) VERTICALLY ALIGNED LIQUID CRYSTAL DISPLAY

(75) Inventor: Norio Koma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 12 days.

(21) Appl. No.: 11/510,295

(22) Filed: Aug. 25, 2006

(65) Prior Publication Data

US 2006/0290861 A1  Dec. 28, 2006

Related U.S. Application Data

(60) Continuation of application No. 10/084,608, filed on Feb. 26, 2002, now Pat. No. 7,301,595, which is a continuation-in-part of application No. 09/768,371, filed on Jan. 23, 2001, now Pat. No. 6,407,794, which is a division of application No. 09/162,984, filed on Sep. 29, 1998, now Pat. No. 6,229,589.

(30) Foreign Application Priority Data

Oct. 1, 1997  (JP) ..................... 9-268973

(51) Int. Cl.
  *G02F 1/1337*  (2006.01)
  *G02F 1/1343*  (2006.01)
(52) U.S. Cl. ................. 349/144; 349/141; 349/142; 349/129
(58) Field of Classification Search .......... 349/130, 349/141–144
  See application file for complete search history.

(56) References Cited

U.S. PATENT DOCUMENTS

| 5,309,264 | A | | 5/1994 | Lien et al. |
| 5,434,690 | A | | 7/1995 | Hisatake et al. |
| 5,710,611 | A | * | 1/1998 | Suzuki et al. ............... 349/129 |
| 5,880,797 | A | | 3/1999 | Yamada et al. |
| 6,573,964 | B1 | * | 6/2003 | Takizawa et al. ............ 349/129 |
| 6,724,452 | B1 | | 4/2004 | Takeda et al. |
| 6,750,935 | B2 | * | 6/2004 | Seo et al. .................... 349/129 |
| 6,879,364 | B1 | * | 4/2005 | Sasaki et al. ................ 349/129 |

FOREIGN PATENT DOCUMENTS

JP  08179378 A  *  7/1996

* cited by examiner

*Primary Examiner*—Julie Ngo
(74) *Attorney, Agent, or Firm*—Hogan & Hartson LLP

(57) ABSTRACT

A vertically aligned type liquid crystal display includes a liquid crystal layer disposed between pixel electrodes and a common electrode and containing vertically aligned liquid crystal molecules, the orientation of the liquid crystal molecules being controlled by an electric field. An orientation controller is formed on the common electrode at a position opposing the pixel electrode and an aspect ratio, i.e., a vertical to horizontal length ratio of the pixel electrode is set to at least 2. Alternatively, the pixel electrode is partitioned into at least two electrode regions so that each region represents a divided pixel electrode. An orientation controller is formed on the common-electrode so as to correspond to each divided pixel electrode, an aspect ratio of each divided pixel electrode is set to at least 2. As such, the influence at the edge sections of the pixel electrode is reduced, viewing angle characteristic and transmittance are improved, and average response time is shortened.

18 Claims, 8 Drawing Sheets

VERTICALLY ALIGNED LIQUID CRYSTAL DISPLAY

This application is a continuation of U.S. patent application Ser. No. 10/084,608 filed on Feb. 26, 2002, now U.S. Pat. No. 7,301,595, which is a continuation in part of U.S. patent application Ser. No. 09/768,371 filed on Jan. 23, 2001, now U.S. Pat. No. 6,407,794, which in turn is a divisional application of a continued prosecution application filed on Jun. 18, 1999 of U.S. patent application Ser. No. 09/162,984 filed on Sep. 29, 1998, now U.S. Pat. No. 6,229,589. This application also claims the benefit of priority under 35 U.S.C. 119 of Japanese patent application No. 9-268973, filed on Oct. 1, 1997.

BACKGROUND OF THE INVENTION

1. Field of the Invention

The present invention relates to a liquid crystal display (LCD) which utilizes opto-electric anisotropy of liquid crystal, and more particularly to a liquid crystal display which achieves an improved response speed and transmittance.

2. Description of the Related Art

LCDs are compact, thin, and low power consumption devices and have been developed for practical use in the field of office automation (OA) and audio-visual (AV) equipment. In particular, active matrix type LCDs which utilize thin film transistors (TFTs) as switching elements are theoretically capable of static actuation at a duty ratio of 100% in a multiplexing manner, and have been used in large screen and high resolution type animation displays.

TFTs are field effect transistors arranged in a matrix on a substrate and connected to individual pixel electrodes which form one side of pixel capacitors with a dielectric layer made of liquid crystal. In a TFT matrix, TFTs located on a same row are simultaneously turned on/off by a given gate line, and each TFT of that row receives a pixel signal voltage from a given drain line. A display voltage is accumulated in the pixel capacitors corresponding to the on-state TFTs and designated by rows and columns. The pixel electrodes and the TFTs are formed on the same substrate, while a common electrode acting as the other side of the pixel capacitors is formed almost entirely on the surface of the second substrate opposite to the first substrate across the liquid crystal layer. That is, the display pixels (i.e., pixels) are defined by partitioning the liquid crystal and the common electrode by pixel electrodes. The voltage accumulated in the pixel capacitors is held insulated by an off-state resistance of the TFTs for one field period or one frame period until the TFTs are turned on again. The liquid crystal is opto-electrically anisotropic, and its transmittance is controlled based on the voltage applied to respective pixel capacitors. The transmittance of each display pixel is independently controlled, so that individual pixels-are observed bright or dark and recognized collectively as a display image by human eyes.

Initial orientation of the liquid crystal is determined by an orientation film disposed at the interface between the liquid crystal and each substrate. For example, a twisted nematic (TN) type LCD uses the liquid crystal in nematic phase which has positive dielectric anisotropy and whose alignment vectors are twisted 90 degrees between the substrates. Typically, a polarizing plate is provided on the outside of each substrate, and, in a TN type, the polarizing axis of each polarizing plate coincides with the orientation of the liquid crystal located in the vicinity of the corresponding substrate. When no voltage is applied, linearly polarized light passes through one polarizing plate, turns its direction in the liquid crystal layer along the twisted alignment of the liquid crystal, and exits from the other polarizing plate, resulting in a "white" display. When the voltage is applied to the pixel capacitors, an electric field is created within the liquid crystal layer and the orientation of the liquid crystal changes its orientation to be parallel to the direction of the applied electric field because of its dielectric anisotropy. As a result, the twisted alignment is collapsed and the incoming, linearly polarized light turns less frequently in the liquid crystal. Consequently, the amount of light ejecting from the other polarizing plate is reduced and the display gradually becomes black. This is known as a normally white mode which is widely applied in the field of TN cells, in which the display is white when no voltage is applied and changes to "black" upon application of a voltage.

FIGS. 1 and 2 show a unit pixel structure of a conventional liquid crystal display, wherein FIG. 1 is a plan view and FIG. 2 is a sectional view along line G-G of FIG. 1. A gate electrode 101 made of a metal, such as Cr, Ta, or Mo, is formed on a substrate 100, and a gate insulating film 102 made of, e.g., $SiN_x$ and/or $SiO_2$ is formed to cover the gate electrode 101. The gate insulating film 102 is covered with a p-Si film 103 in which an implantation stopper 104 which is made of $SiO_2$ or the like and patterned into the shape of the gate electrode 101 is used to form a lightly doped region (LD) having a low concentration (N−) of impurities, such as P or As, and source and drain regions (S, D) having a high concentration (N+) of the same impurities located outside the LD region. A region located immediately below the implantation stopper 104 is an intrinsic layer which includes substantially no impurities and acts as a channel region (CH). The p-Si 103 is covered with an interlayer insulating film 105 made of $SiN_x$ or the like. A source electrode 106 and a drain electrode 107, both made of a material such as Al, Mo, or the like, are formed on the interlayer insulating film 105, each electrode being connected to the source region S and the drain region D, respectively, via a contact hole CT1 formed in the interlayer insulating film 105. The entire surface of the thus formed TFT is covered with a planarization insulating film 108 made of SOG (spin on glass), BPSG (boro-phospho silicate glass), acrylic resin, or the like. A pixel electrode 109 made of a transparent conductive film such as ITO (indium tin oxide) is formed on the planarization insulating film 108 for actuating the liquid crystal, and is connected to the source electrode 106 via a contact hole CT2 formed in the planarization insulating film 108.

An orientation film 120 formed by a high molecular film, such as polyimide, is disposed on the entire surface on the above elements and is subjected to a rubbing treatment to control the initial orientation of the liquid crystal. Meanwhile, a common electrode 131 made of ITO is formed on the entire surface of another glass substrate 130 arranged opposite to the substrate 100 across a liquid crystal layer. The common electrode 131 is covered with an orientation film 133 made of polyimide or the like and is subjected to rubbing.

Here, a DAP (deformation of vertically aligned phase) type LCD is shown which uses a nematic phase liquid crystal 140 having negative dielectric anisotropy and vertical orientation films as the orientation films 120 and 133. The DAP type LCD is one of the electrically controlled birefringence (ECB) type LCDs which use a difference of refractive indices of longer and shorter axes of a liquid crystal molecule, so-called a birefringence, to control transmittance. In the DAP type LCD, upon application of a voltage, an incoming light transmitting through one of orthogonally placed polarization plates enters the liquid crystal layer as a linearly polarized light, and is birefracted in the liquid crystal to become an elliptically polarized light. Then, retardation, which is the difference in phase velocities of ordinary and extraordinary ray components in the liquid crystal, is controlled according to the intensity of the electric field in the liquid crystal layer to allow the light to be emitted from the other polarization plate at a desired transmittance. In this case, the display is in a normally black mode, since the display is black when no voltage is applied and changes to white upon application of an appropriate voltage.

As described above, the liquid crystal display displays an image at an intended transmittance or color phase by applying a desired voltage to the liquid crystals sealed between a pair of substrates having predetermined electrodes formed thereon and by controlling a turning route or a birefringence of light in the liquid crystal. Specifically, the retardation is controlled by changing the orientation of the liquid crystal, to thereby adjust the light intensity of the transmitted light in the TN mode, while allowing the separation of color phases in the ECB mode by controlling a spectroscopic intensity depending on wavelength. Since the retardation depends on the angle between the longer axis of the liquid crystal molecule and the orientation of the electric field, the retardation still changes relative to the viewer's observation angle, i.e., a viewing angle, even when such an angle is linearly controlled by the adjustment of the electric field intensity. Thus, as the viewing angle changes, the light intensity or the color phase of the transmitted light also changes, causing a so-called viewing angle dependency problem.

Problems of decreased transmittance and slower response speed also remain.

SUMMARY OF THE INVENTION

In order to solve at least the problems mentioned above, according to the present invention, there is provided a vertically aligned type liquid crystal display, comprising a vertically aligned liquid crystal layer disposed between a plurality of pixel electrodes and a common electrode, the orientation of the liquid crystal layer being controlled by an electric field; wherein the common electrode has one or more orientation controllers formed in an area corresponding to each of the plurality of pixel electrodes, and wherein each of the plurality of pixel electrodes is divided into two or more electrically connected electrode regions, which are arranged in parallel and spaced from each other in the horizontal direction when the shorter edge direction and the longer edge direction of each of the electrode regions are defined as the horizontal and vertical directions, respectively, and a vertical to horizontal length ratio of each electrode region is equal to or greater than 2.

According to another aspect of the present invention, it is preferable that one orientation controller is formed for each of the electrode regions.

According to still another aspect of the present invention, it is preferable that one orientation controller is formed for each of the electrode regions, and that each of the orientation controllers has a sloped projection which extends along the longer edge of each of the electrode regions in an area corresponding to the center part of each of the electrode regions.

According to yet another aspect of the present invention, it is preferable that the orientation controller has a sloped projection which braches at both longitudinal ends of each of the electrode regions toward corner sections of each of the electrode regions.

With the above structure, the present invention reduces the influence at edge sections of the pixel electrodes by the combination of the above mentioned orientation controller and the pixel electrodes, thereby achieving improved viewing angle characteristic and transmittance and a reduced average response time of the display.

As is apparent from the above description, the influence at the edge sections of the pixel electrode is reduced, the viewing angle characteristic and the transmittance are improved, and the average response time is shortened by setting an aspect ratio (V/H) of each pixel electrode or each divided pixel electrode to at least a predetermined value.

DESCRIPTION OF THE PREFERRED EMBODIMENTS

Figure 1:
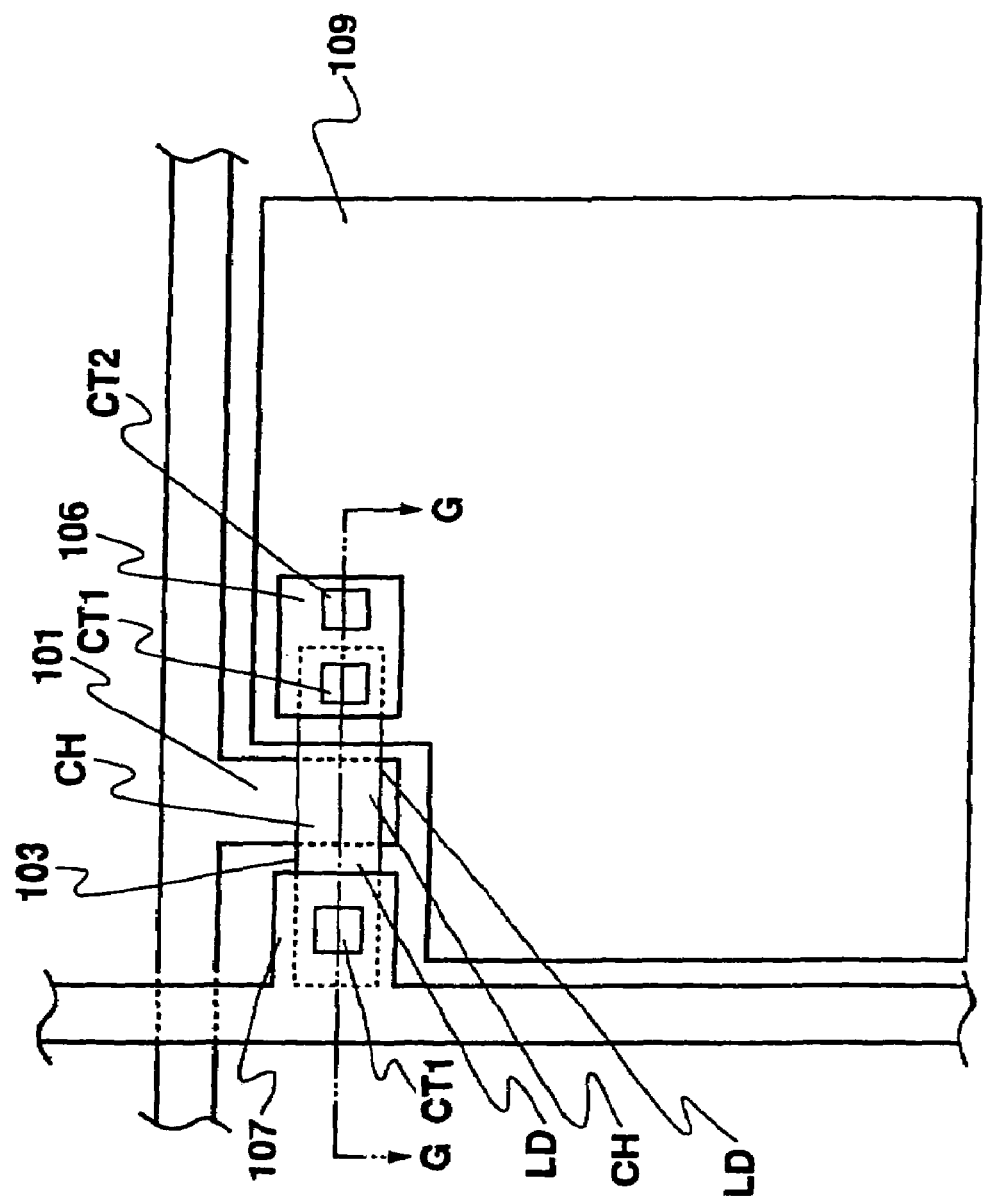
FIG. 1 is a plan view showing a unit pixel of a conventional liquid crystal display.
Figure 2:
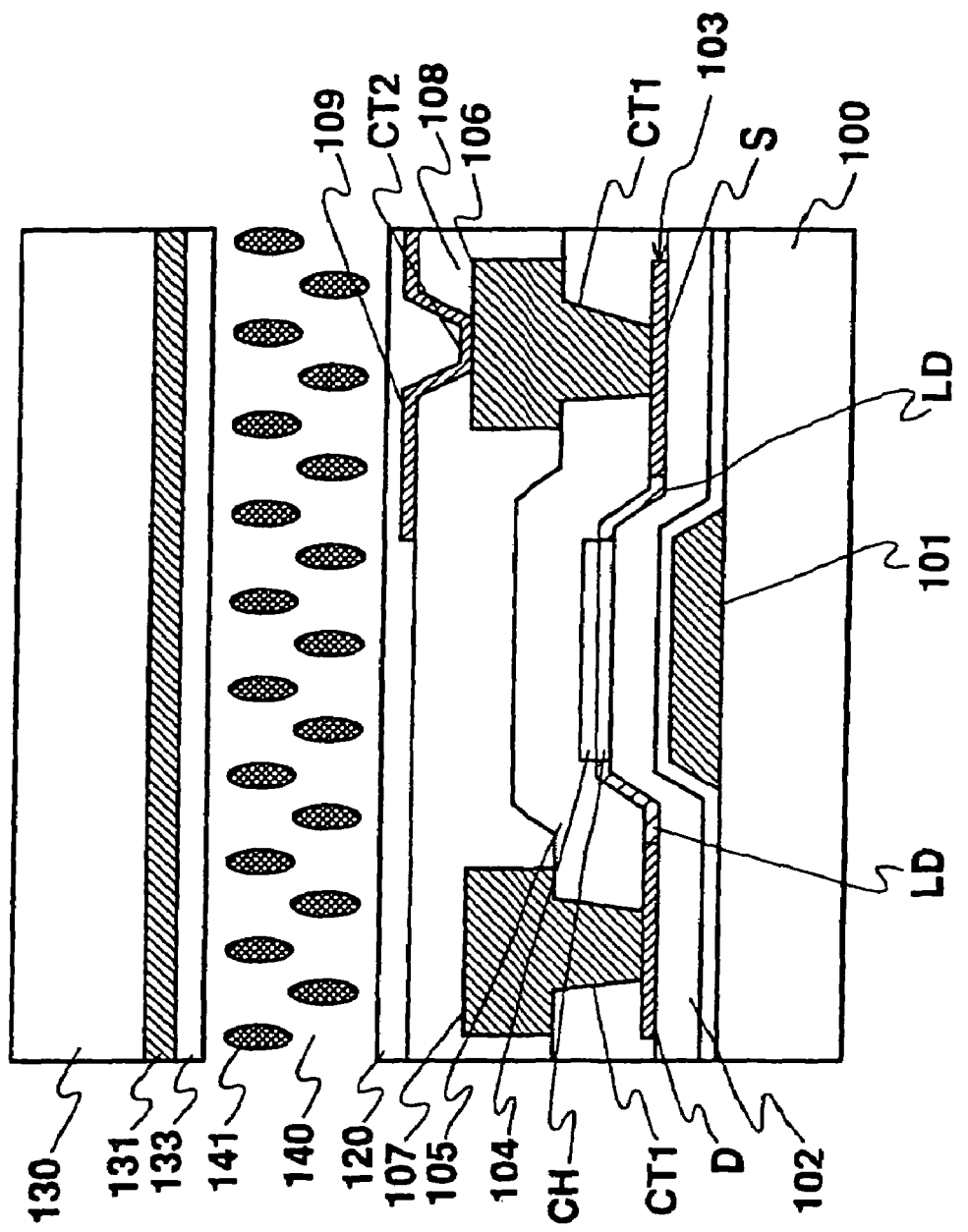
FIG. 2 is a sectional view taken along line G-G of FIG. 1.
Figure 3:
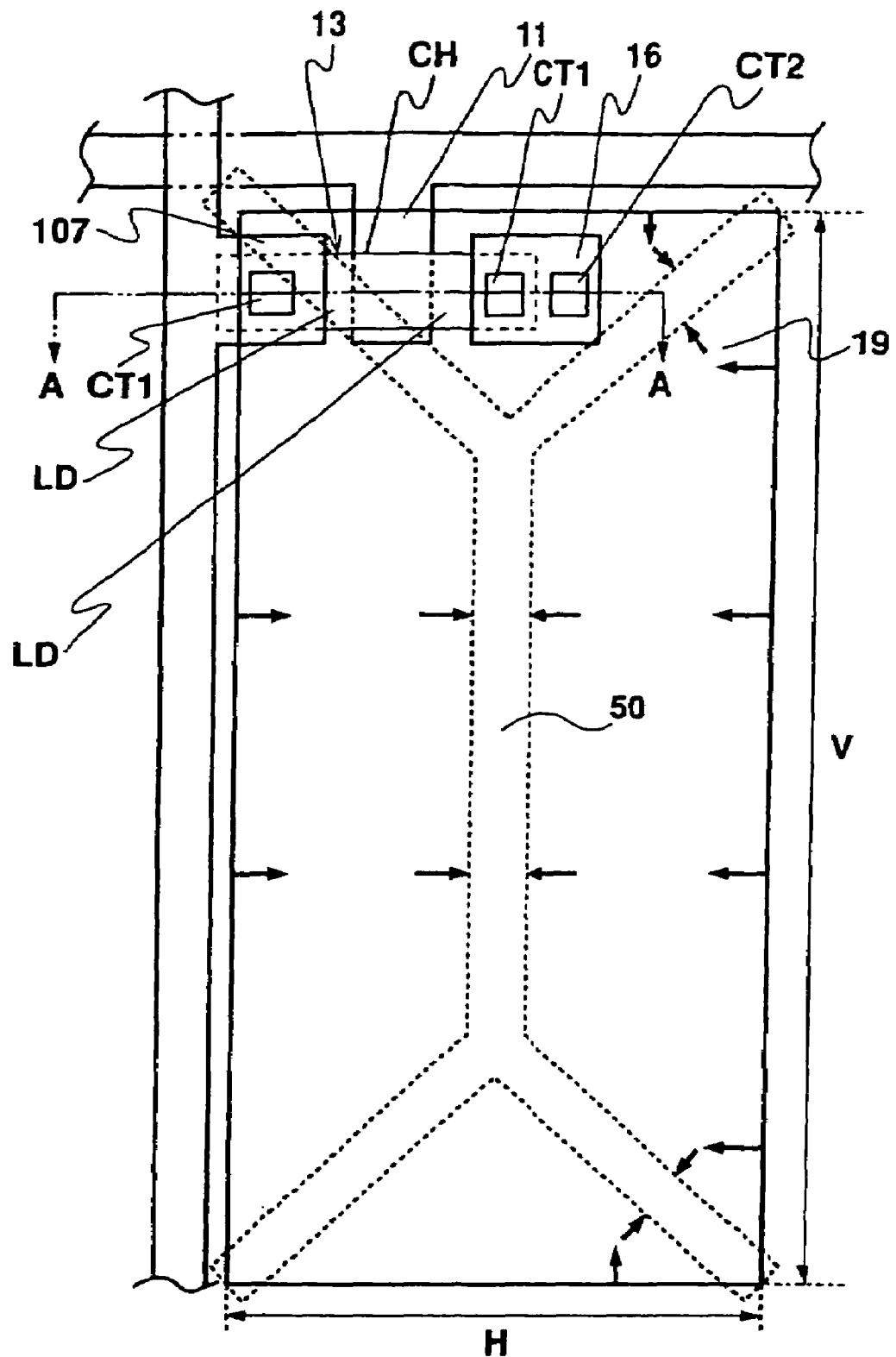
FIG. 3 is a plan view showing a unit pixel of a liquid crystal display according to a first embodiment of the present invention.
Figure 4:
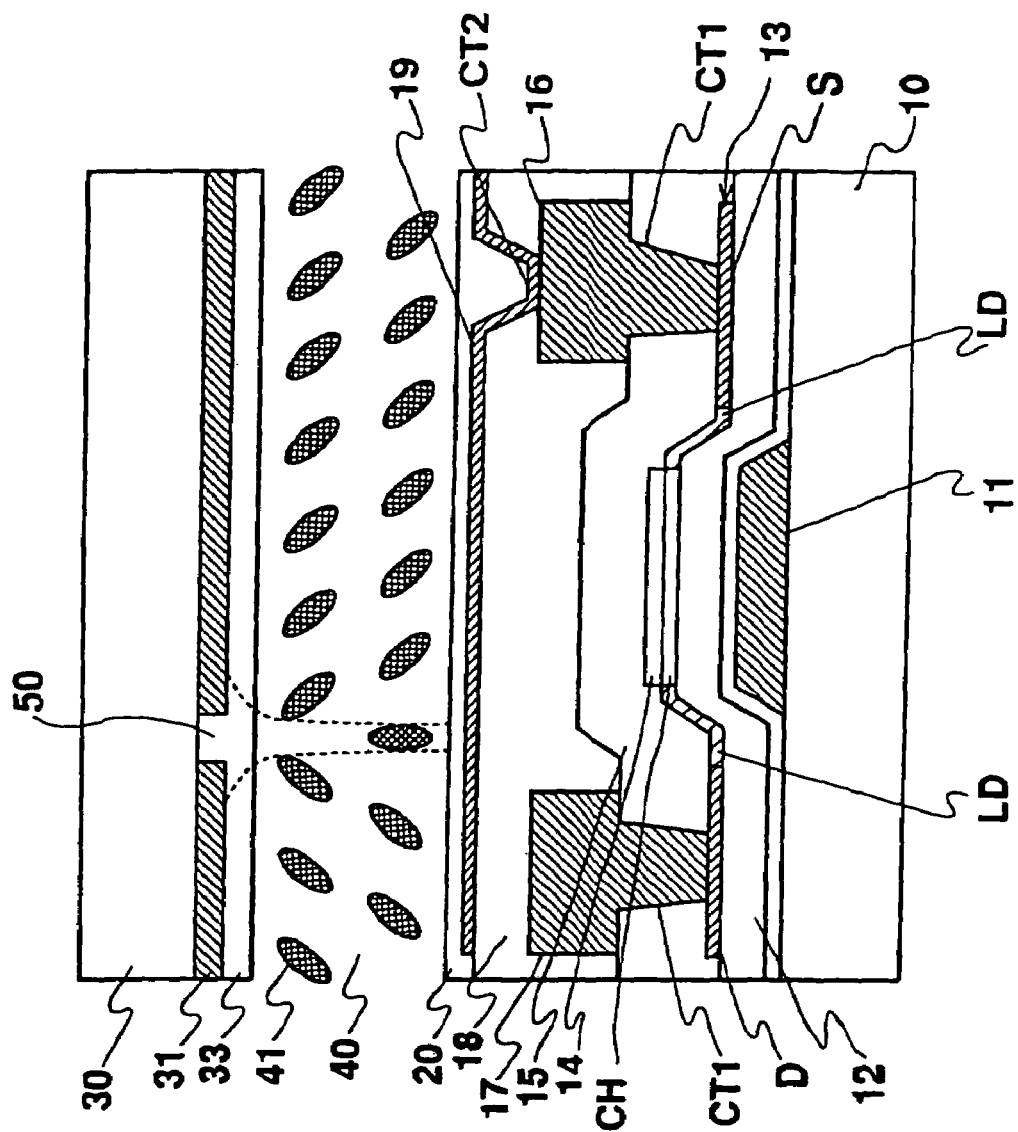
FIG. 4 is a sectional view taken along line A-A of FIG. 3.

Referring to FIGS. 3 and 4, a unit pixel structure of a liquid crystal display according to the present invention is shown, wherein FIG. 3 is a plan view and FIG. 4 is a sectional view taken along line A-A of FIG. 3. A gate electrode 11 made of a metal, such as Cr, Ta, or Mo, is formed on a substrate 10, and a gate insulating film 12 made of, e.g., SiNx and/or $SiO_2$ is formed to cover the gate electrode 11. The gate insulating film 12 is covered with a p-Si film 13 in which an implantation stopper 14 which is made of $SiO_2$ or the like and patterned into the shape of the gate electrode 11 is used to form a lightly doped region (LD) having a low concentration (N−) of impurities, such as P or As, and source and drain regions (S, D) having a high concentration (N+) of the same impurities located outside the LD region. A region located immediately below the implantation stopper 14 is an intrinsic layer which includes substantially no impurities and acts as a channel region (CH). The p-Si 13 is covered with an interlayer insulating film 15 made of SiNx or the like. A source electrode 16 and a drain electrode 17, both made of Al, Mo, or the like, are formed on the interlayer insulating film 15, each electrode being connected to the source region S and the drain region D, respectively, via a contact hole CT1 formed in the interlayer insulating film 15. The entire surface of the thus formed TFT is covered with a planarization insulating film 18 made of SOG (spin on glass), BPSG (boro-phospho silicate glass), acrylic resin, or the like. A pixel electrode 19 made of a transparent electrode such as ITO (indium tin oxide) is formed on the planarization insulating film 18 for actuating the liquid crystal, and is connected to the source electrode 16 via a contact hole CT2 formed in the planarization insulating film 18.

An orientation film 20 formed by a macro molecular film, such as polyimide, is formed on the entire surface of the above elements, while a common electrode 31 made of ITO is formed on the entire surface of another glass substrate 30 arranged opposite to the substrate 10 across a liquid crystal layer. The common electrode 31 is covered with an orientation film 33 made of polyimide or the like. In the present invention, the orientation films 20 and 33 and the liquid crystal 40 are selected so that liquid crystal molecules 41 are aligned vertically.

In addition, an orientation controller such as in the form of, for example, an orientation control window 50 is formed on the common electrode 31 facing the pixel electrode 19, the orientation control window 50 having a shape of upper and lower Y-shaped slits connected to each other with a vertical symmetry. More specifically, this window 50 has a shape in which a slit extends in a straight line along the longer edge of the pixel electrode 19 in an area corresponding to the center part of the pixel electrode 19, and branches (forks) into two branches at an area corresponding to both longitudinal ends of the pixel electrode 19 toward the areas corresponding to its corner sections. Since the electric field applied to the liquid crystal molecules 41 located immediately below the orientation control window 50 is not sufficiently strong to tilt those molecules 41, the liquid crystal molecules 41 is vertically aligned. Around these molecules 41, however, an electric field as indicated by a dotted line in FIG. 4 is generated, which controls the molecules 41 to direct their longer axes perpendicular to the applied field. This is also true at the edge sections of the pixel electrode 19 and the longer axes of the liquid crystal molecules 41 are oriented perpendicularly to the electric field. The tilt of these molecules is propagated to other molecules located in the interior of the layer because of continuity of the liquid crystal. Thus, the liquid crystal molecules 41 are controlled to orient themselves in substantially the same direction in the center part of the pixel electrode 19 as shown by the arrow in FIG. 3, but the orientation is not in the same direction in the vicinity of the edge sections. It has been found that better viewing angle characteristic and transmittance are achieved when the orientation is uniform.

To achieve this, according to the present invention the aspect ratio, i.e., the ratio between the vertical and horizontal lengths V/H of the pixel electrode 19 facing the orientation control window 50 is set to at least 2. As such, it is possible to enlarge the area where the liquid crystal molecules are oriented in the same direction, while decreasing the percentage of an unevenly oriented area. This allows improvements in the viewing angle characteristic, in the transmittance, and even in the response speed.

Figure 5A:
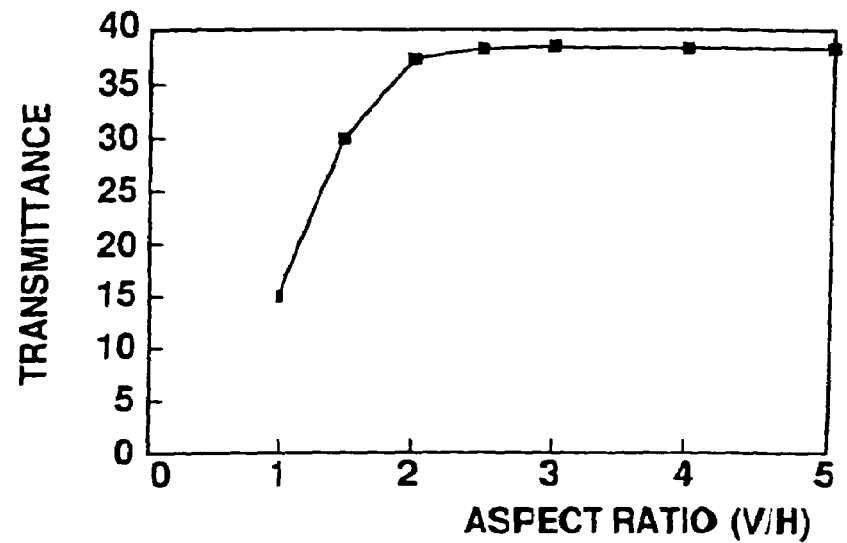
FIGS. 5A and 5B are graphs plotting respectively the transmittance and the average response time as a function of the aspect ratio of the liquid crystal display, according to the present invention.
Figure 5B:
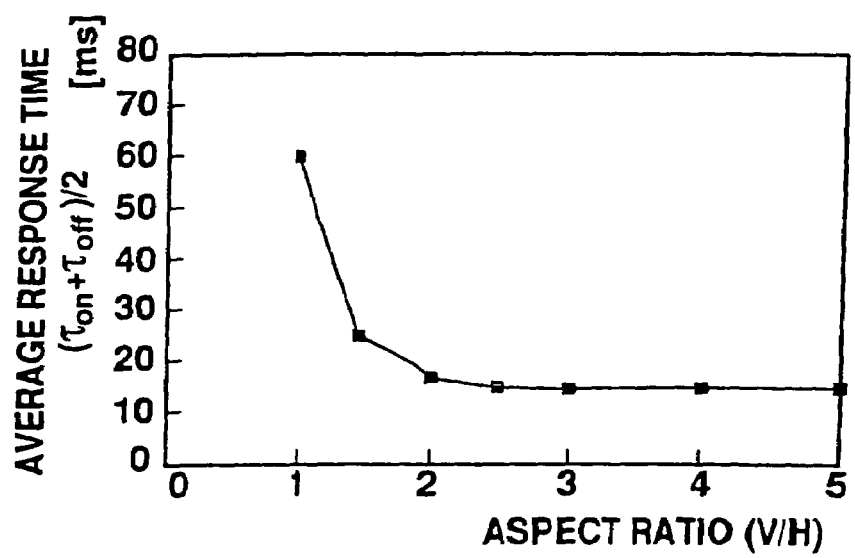

FIGS. 5A and 5B show the experimental results, and plot respectively the relationship between the aspect ratio (V/H) of the pixel electrode 19 and its transmittance and average response time ((τ on+τ off)/2). As shown in the graph of FIG. 5A, the transmittance is low until the aspect ratio reaches 2, and then increases to a preferable value and is maintained at that value. As shown in the graph of FIG. 5B, the average response time is long until the aspect ratio reaches 2, and then is reduced rapidly and remain generally unchanged. In other words, if the aspect ratio of the pixel electrode 19 is set equal to 2 or greater, a higher transmittance and a reduced average response time can be achieved.

Figure 6:
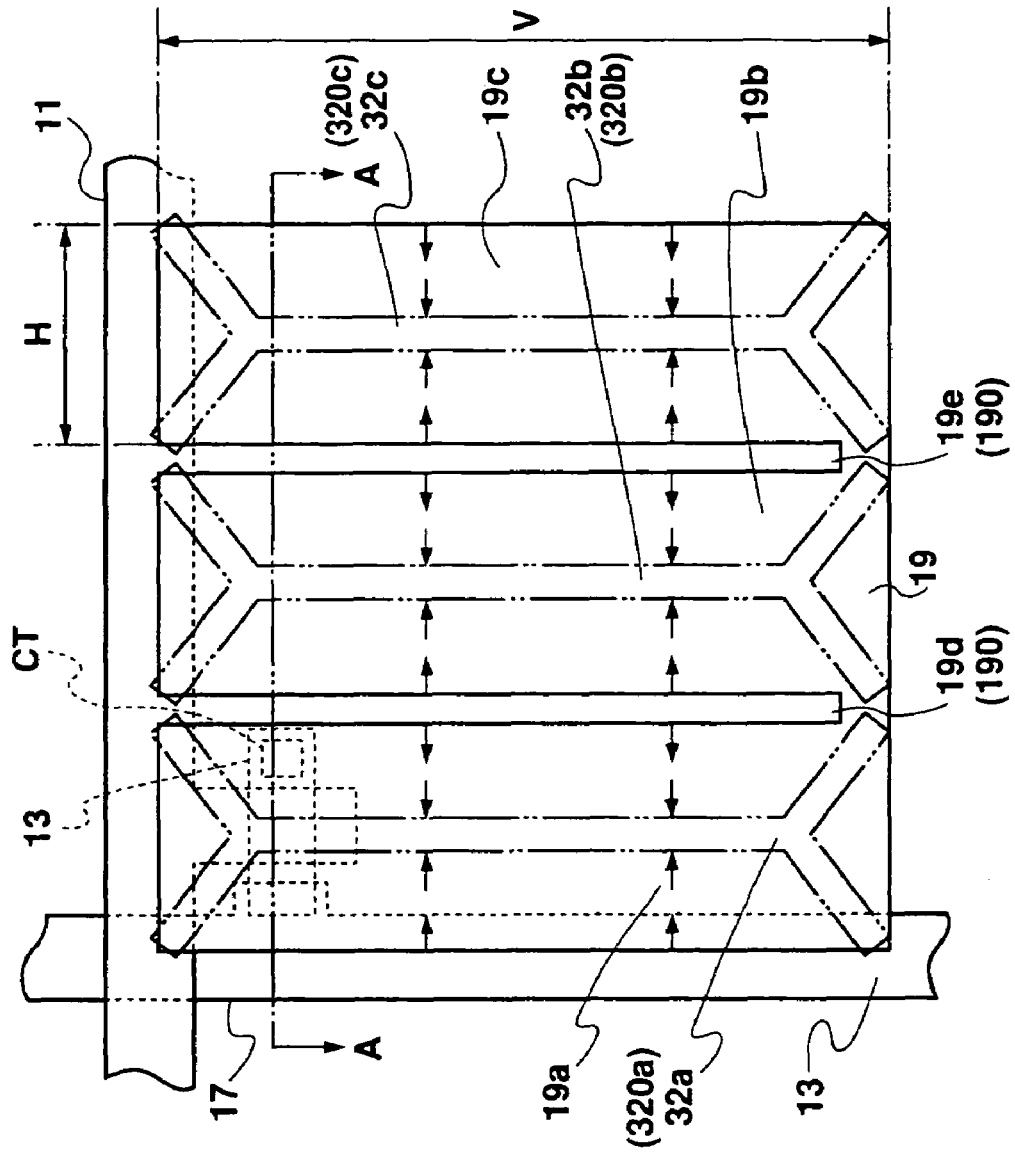
FIG. 6 is a plan view showing a unit pixel of the liquid crystal display according to a second embodiment of the present invention.
Figure 7:
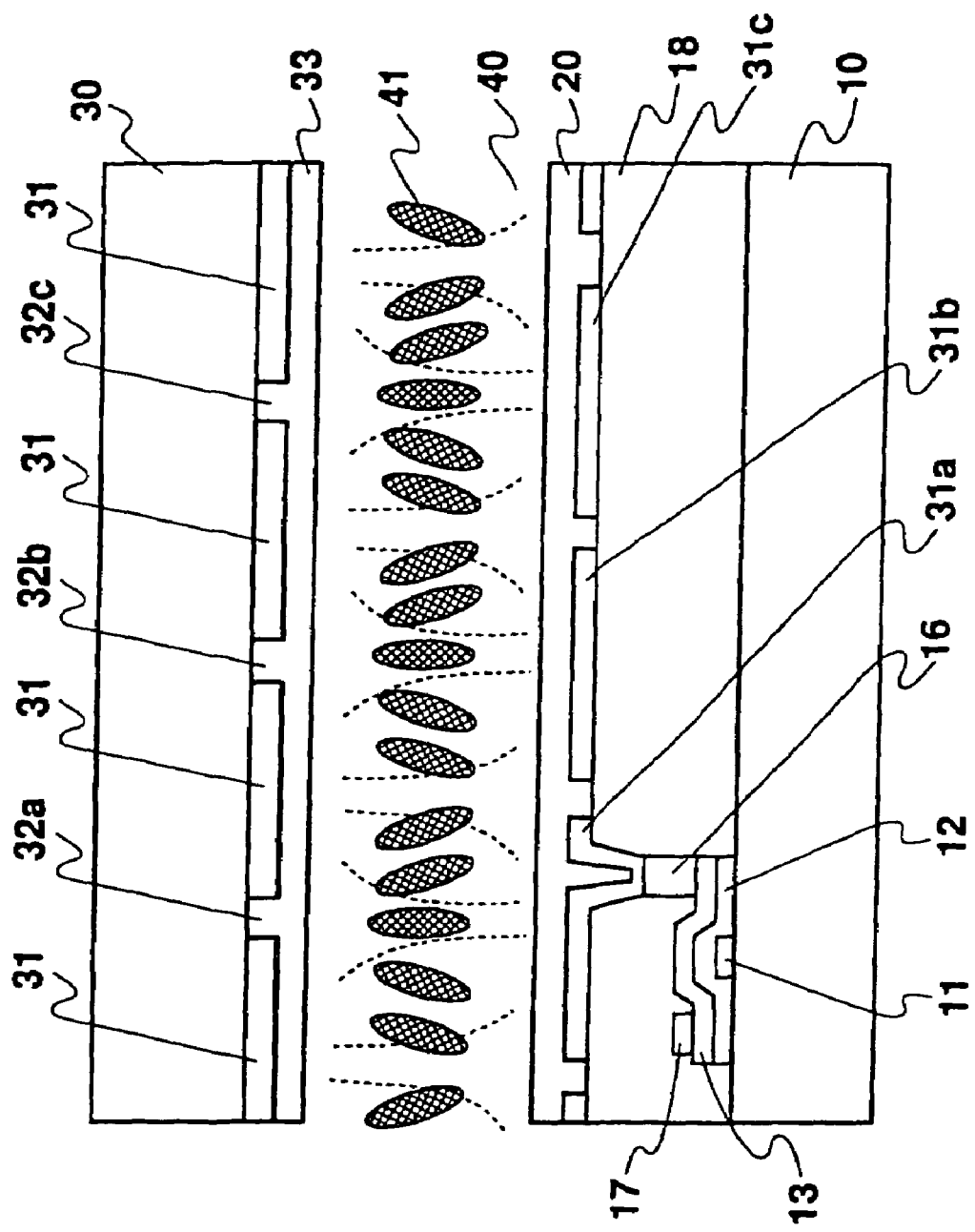
FIG. 7 is a sectional view taken along line A-A of FIG. 6.

Referring next to FIGS. 6 and 7, a second embodiment, of the present invention will be described.

FIG. 6 is a plan view showing a unit pixel structure of a liquid crystal display and FIG. 7 is a sectional view taken along line A-A of FIG. 6. It is to be noted, that for the sake of clarity the TFT structure is not shown in FIG. 7, but it is of the same structure as that shown in FIG. 4.

In this embodiment, the vertical length of the pixel electrode 19 corresponding to the unit pixel is longer than the horizontal length. In this structure, slits 19d and 19e are formed in the vertical direction in the-pixel electrode 19 like a comb, to divide (in this embodiment, the pixel electrode is divided equally) the pixel electrode 19 into three pixel electrode regions 19a, 19b, and 19c such that the aspect ratio V/H of each pixel electrode region is 2 or greater. It is to be noted, however, these pixel electrode regions 19a, 19b, and 19c are partly connected to each other under the slits 19d and 19e, because the pixel electrode regions correspond to the same pixel.

In this case, orientation control windows 32a, 32b, and 32c are formed in the common electrode 31 formed on the opposing substrate 30, each window corresponding to each pixel electrode region 19a, 19b, and 19c. In each pixel electrode region 19a, 19b, and 19c, the liquid crystal molecules are oriented in the reverse directions about each orientation control window. This increases the area where the orientation is uniform while decreasing the area of an abnormal orientation at the edge sections of the pixel electrode. Thus, the viewing angle characteristic, transmittance, and response time can be improved, similar to the above first embodiment.

Figure 8:
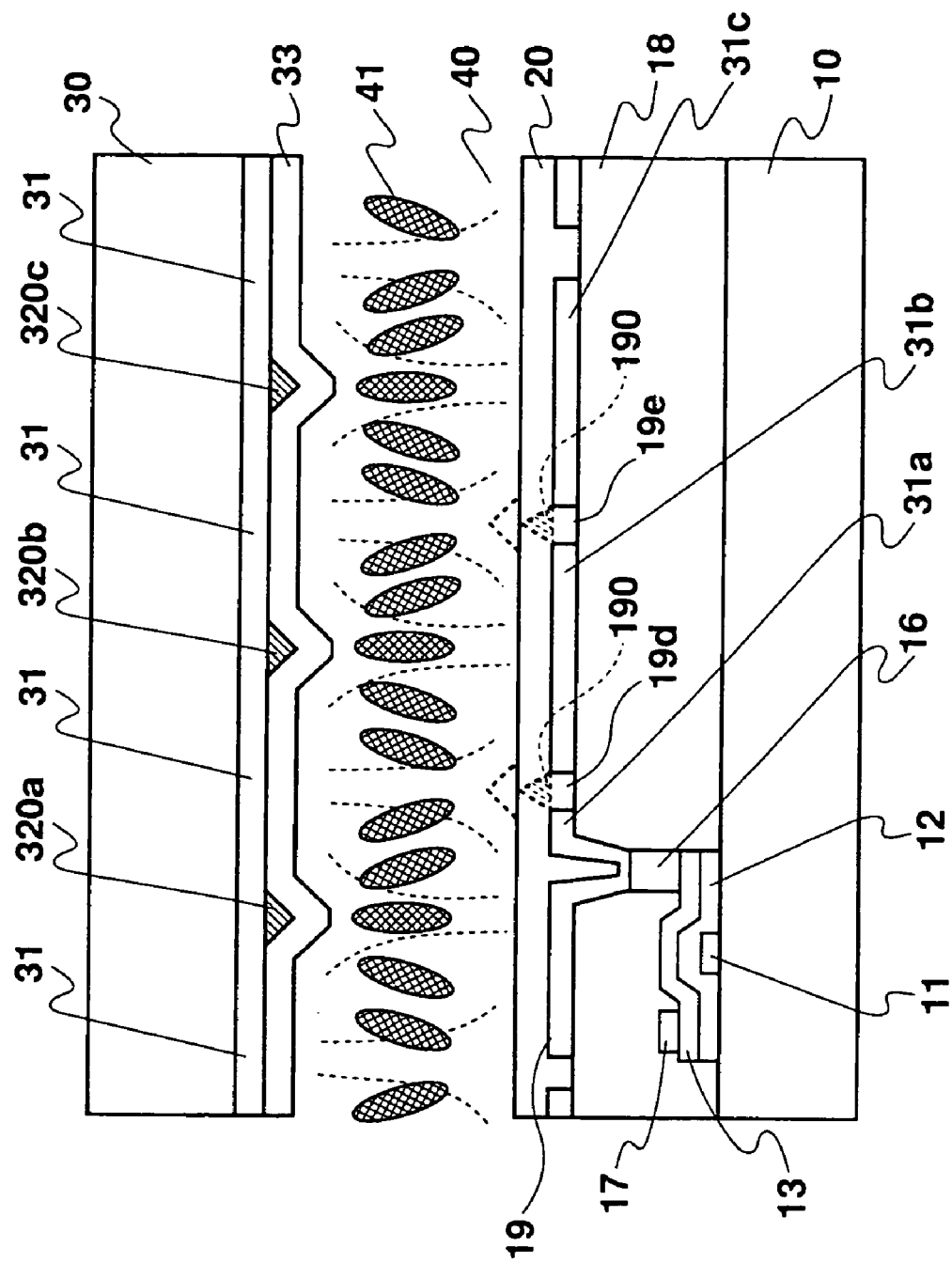
FIG. 8 is a partial sectional view of another LCD having a orientation controller, taken along line A-A of FIG. 6.

FIG. 8 is a sectional view showing another structure of an orientation controller. FIG. 8 is similar to FIG. 7 in that both FIGS. 7 and 8 are sectional views along the A-A line of FIG. 6. In FIG. 7, orientation control windows 32a, 32b, and 32c are formed in the common electrode 31 as the orientation controller (orientation divider) for controlling the orientation of the liquid crystals within a pixel. In the embodiment shown in FIG. 8, on the other hand, slopes 320 (320a, 320b, and 320c) (projections having sloped surfaces with respect to the substrate plane) are formed on the common electrode 31 as an orientation controller instead of the windows. The other structures are identical to those in FIG. 7. The orientation control slopes 320 are formed at positions on the common electrode 31 indicated in FIG. 6 with a two-dot chain line.

The orientation control slopes 320 are made of materials such as, for example, acrylic resin and comprises a sloped projection having sloped surfaces projecting from the common electrode plane towards the liquid crystals on the common electrode 31.

Two factors account for orientation control (orientation division) of the liquid crystals by the orientation control slopes 320 as shown in FIG. 8.

The first factor is that the surface of the orientation film 33 formed on the entire surface of the common electrode 31 to cover the orientation control slopes 320 is tilted along the slopes 320 towards the substrate plane. The orientation film 33 has a function to control the initial orientation of the liquid crystal, and the liquid crystal molecules are controlled in the vertical direction with respect to the contact surface of the orientation film 33 to the liquid crystal. Therefore, when the orientation film 33 is formed on the slope 320 and the contact surface of the orientation film 33 with respect to the liquid crystal molecules is sloped toward the substrate plane, the liquid crystals in the proximity of the sloped surface is vertically aligned with respect to the sloped surface. As a result, the orthogonal projection of the alignment vector of the initial orientation of the liquid crystals is controlled in reverse directions (180 degrees) with the boundary at the point near the peak of each of the orientation control slopes 320a, 320b, and 320c, and the orientation directions of the liquid crystals are divided within a pixel so that a plurality of regions having different orientation directions are formed. As shown in FIG. 6, the pixel electrode 19 formed for each pixel has a comb-like pattern in which slits 19d and 19e are formed, and is divided into three electrode regions 19a, 19b, and 19c, with the aspect ratio V/H of each electrode region set equal to 2 or greater. By setting the aspect ratio V/H of each electrode region equal to 2 or greater, improvements in transmittance and reduction in the average response time as shown in FIGS. 5A and 5B can be obtained even when the area per pixel is relatively large. Moreover, because the orientation region is divided into a plurality of regions by the orientation control slopes 320 within the area corresponding to the pixel electrode 19, the viewing angle can be widened.

The second factor is that, similar to the windows opened in the common electrode 31 in the above embodiments, the orientation control slopes 320 shield the electric field between the common electrode 31 and the pixel electrode 19. In order to improve such an advantage, it is preferable to use a material having a high electric field shielding capability as the material for the sloped projection forming the orientation control slopes 320. Because the orientation slopes 320 function in a manner similar to the orientation windows 32, no electric field is generated in the liquid crystal layer at the regions where the slopes 320 are formed and an electric field as shown by a dotted line in FIG. 8 is generated near the ends of the slopes 320, resulting in reversal and division of the orientation directions of the liquid crystal with the boundary at the slopes 320.

Moreover, it is also possible to form similar slopes on the pixel electrode 19 in place of the slits 19d and 19e formed on the pixel electrode 19. In other words, by forming orientation control slopes 190 at the boundary portion of the electrode regions 19a, 19b, and 19c on the pixel electrode 19 formed without slits, similar to the common electrode, the orientation of the liquid crystals can be controlled to revert with the boundary at the slopes 190 so that an orientation control function equivalent to that achieved by the slits 19d and 19e can be achieved.

With such orientation control slopes 320 and 190 also, the orientation directions of the liquid crystals can be divided evenly and controlled within one pixel, so that a liquid crystal display with large viewing angle and high display quality can be achieved.

What is claimed is:

1. A vertically aligned liquid crystal display, comprising:
   vertically aligned liquid crystal sealed between a plurality of pixel electrodes and a common electrode, the orientation of the liquid crystal being controlled by an electric field, wherein
   the common electrode comprises a plurality of orientation controllers formed in areas corresponding to each of the plurality of pixel electrodes, respectively,
   one or more line-shaped slits in which no electrode is present is formed in each of the plurality of pixel electrodes and each of the plurality of pixel electrodes is divided by the one or more slits into two or more electrode regions, and
   the slit is formed extending from one end of a pixel region toward another end of the pixel region, and the pixel electrode is electrode-material-free at the one end from which the slit extends, and is divided by the slits into the electrode regions at the one end.

2. A vertically aligned liquid crystal display according to claim 1, wherein
   each of the plurality of orientation controllers is provided corresponding to each of the electrode regions.

3. A vertically aligned liquid crystal display according to claim 2 wherein
   a corresponding one of the plurality of orientation controllers provided corresponding to the electrode regions is placed parallel to a direction of extension of at least a portion of the slit.

4. A vertically aligned liquid crystal display according to claim 1, wherein
   a plurality of slits are provided, and the slits are provided parallel to each other.

5. A vertically aligned liquid crystal display according to claim 4, wherein
   all of the plurality of slits provided in the plurality of pixel electrodes are formed extending from a same end of the pixel electrode toward another end.

6. A vertically aligned liquid crystal display according to claim 1, wherein
   the liquid crystal is vertically aligned with respect to a plane of a substrate and light is blocked when no voltage is applied to the liquid crystal, and
   an amount of emission light emitted from the display is adjusted by the liquid crystal tilting from a vertically aligned state according to an applied voltage when a voltage is applied to the liquid crystal.

7. A vertically aligned liquid crystal display, comprising:
   vertically aligned liquid crystal sealed between a plurality of pixel electrodes and a common electrode, the orientation of the liquid crystal being controlled by an electric field, wherein
   the common electrode comprises a plurality of orientation controllers formed in areas corresponding to each of the plurality of pixel electrodes, respectively,
   each of the plurality of pixel electrodes has one or more line-shaped projections and is divided by the one or more projections into two or more electrode regions, and
   the projection is formed from one end of a pixel region toward another end of the pixel region and the pixel electrode is divided by the projections into the electrode regions at the one end.

8. A vertically aligned liquid crystal display according to claim 7, wherein
   each of the plurality of orientation controllers is provided corresponding to each of the electrode regions.

9. A vertically aligned liquid crystal display according to claim 8, wherein
   a corresponding one of the plurality of orientation controllers provided corresponding to the electrode regions is placed parallel to a direction of extension of at least a portion of the projection.

10. A vertically aligned liquid crystal display according to claim 7, wherein
    a plurality of projections are provided, and the projections are provided parallel to each other.

11. A vertically aligned liquid crystal display according to claim 10, wherein
    all of the plurality of projections provided in the plurality of pixel electrodes are formed extending from a same end of the pixel electrode toward another end.

12. A vertically aligned liquid crystal display according to claim 7, wherein
    the liquid crystal is vertically aligned with respect to a plane of a substrate and light is blocked when no voltage is applied to the liquid crystal, and an amount of emission light emitted from the display is adjusted by the liquid crystal tilting from a vertically aligned state according to an applied voltage when a voltage is applied to the liquid crystal.

13. A vertically aligned liquid crystal display, comprising:
vertically aligned liquid crystal sealed between a plurality of pixel electrodes and a common electrode, the orientation of the liquid crystal being controlled by an electric field, wherein
the common electrode comprises, as a plurality of orientation controllers, a plurality of orientation windows formed in areas corresponding to each of the plurality of pixel electrodes, respectively,
each of the plurality of pixel electrodes has one or more line-shaped projections, or one or more line-shaped slits in which no electrode is present are formed in each of the plurality of pixel electrodes, and each of the plurality of pixel electrodes is divided by the one or more projections or the one or more slits into two or more electrode regions, and
the projection or the slit is formed extending from one end of a pixel region toward another end of the pixel region and the pixel electrode is divided by the slits or the projections into the electrode regions at the one end.

14. A vertically aligned liquid crystal display according to claim 13, wherein each of the plurality of orientation windows is provided corresponding to each of the electrode regions.

15. A vertically aligned liquid crystal display according to claim 14, wherein
a corresponding one of the plurality of orientation windows provided corresponding to the electrode regions is placed parallel to a direction of extension of at least a portion of the projection or the slit.

16. A vertically aligned liquid crystal display according to claim 13, wherein
a plurality of projections or a plurality of slits are provided, and the projections or the slits are provided parallel to each other.

17. A vertically aligned liquid crystal display according to claim 16, wherein
all of the plurality of projections or slits provided in the plurality of pixel electrodes is formed extending from a same end of the pixel electrode toward another end.

18. A vertically aligned liquid crystal display according to claim 13, wherein
the liquid crystal is vertically aligned with respect to a plane of a substrate and light is blocked when no voltage is applied to the liquid crystal, and
an amount of emission light emitted from the display is adjusted by the liquid crystal tilting from a vertically aligned state according to an applied voltage when a voltage is applied to the liquid crystal.

* * * * *